US007546487B2

(12) United States Patent
Marisetty et al.

(10) Patent No.: US 7,546,487 B2
(45) Date of Patent: Jun. 9, 2009

(54) OS AND FIRMWARE COORDINATED ERROR HANDLING USING TRANSPARENT FIRMWARE INTERCEPT AND FIRMWARE SERVICES

(75) Inventors: Suresh Marisetty, Fremont, CA (US); Andrew J. Fish, Olympia, WA (US); Koichi Yamada, Los Gatos, CA (US); Scott D. Brenden, Bothell, WA (US); James B. Crossland, Banks, OR (US); Shivnandan Kaushik, Portland, OR (US); Mohan J. Kumar, Aloha, OR (US); Jose A. Vargas, Rescue, CA (US)

(73) Assignee: Intel Corporation, Santa Clara, CA (US)

(*) Notice: Subject to any disclaimer, the term of this patent is extended or adjusted under 35 U.S.C. 154(b) by 630 days.

(21) Appl. No.: 11/227,831

(22) Filed: Sep. 15, 2005

(65) Prior Publication Data

US 2007/0061634 A1 Mar. 15, 2007

(51) Int. Cl.
G06F 11/00 (2006.01)
G06F 11/07 (2006.01)

(52) U.S. Cl. .............................. 714/27; 714/10; 714/37

(58) Field of Classification Search .................. 714/9, 714/12, 30, 10, 27, 37, 38
See application file for complete search history.

(56) References Cited

U.S. PATENT DOCUMENTS 5,862,308 A * 1/1999 Andress et al. ............... 714/10
6,587,966 B1 * 7/2003 Chaiken et al. ............... 714/34
6,684,343 B1 * 1/2004 Bouchier et al. ............... 714/4
6,889,340 B1 * 5/2005 Bramley, Jr. ................. 714/6
7,203,865 B2 * 4/2007 Sullivan ...................... 714/38
7,269,768 B2 * 9/2007 Rothman et al. ............ 714/723
2003/0070115 A1 * 4/2003 Nguyen et al. ............... 714/23
2003/0074601 A1 * 4/2003 Schultz et al. ............... 714/15
2003/0126498 A1 * 7/2003 Bigbee et al. ............... 714/10
2003/0191607 A1 * 10/2003 Arndt et al. ................ 702/186
2004/0019835 A1 * 1/2004 Marisetty et al. ............ 714/48
2006/0075301 A1 * 4/2006 Fossum et al. ............... 714/38
2006/0230254 A1 * 10/2006 Barlow et al. ............... 712/35
2007/0016827 A1 * 1/2007 Lopez et al. ................. 714/31

* cited by examiner

*Primary Examiner*—Scott T Baderman
*Assistant Examiner*—Joseph Schell
(74) *Attorney, Agent, or Firm*—Blakely, Sokoloff, Taylor & Zafman LLP

(57) ABSTRACT

Methods and architectures for performing hardware error handling using coordinated operating system (OS) and firmware services. In one aspect, a firmware interface is provided to enable an OS to access firmware error-handling services. Such services enable the OS to access error data concerning platform hardware errors that may not be directed accessed via a platform processor or through other conventional approaches. Techniques are also disclosed for intercepting the processing of hardware error events and directing control to firmware error-handling services prior to attempting to service the error using OS-based services. The firmware services may correct hardware errors and/or log error data that may be later accessed by the OS or provided to a remote management server using an out-of-band communication channel. In accordance with another aspect, the firmware intercept and services may be performed in a manner that is transparent to the OS.

13 Claims, 12 Drawing Sheets

Protocol Interface Structure:

| typedef { | |
|---|---|
| EFI_SYSTEM_GET_ERROR_RECORD | *GetErrorRecord;* |
| EFI_SYSTEM_SET_ERROR_RECORD | *SetErrorRecord;* |
| EFI_SYSTEM_CLEAR_ERROR_RECORD | *ClearErrorRecord;* |
| EFI_SYSTEM_GET_ERROR_INFO | *GetErrorInfo;* |
| EFI_SYSTEM_SET_ERROR_INFO | *SetErrorInfo;* |
| } EFI_SYSTEM_ERROR_LOG_PROTOCOL; | |

Parameters:

| | |
|---|---|
| *GetErrorRecord()* | Returns a record or the next available record to the caller. This function is reentrant. |
| *SetErrorRecord()* | Sets or logs a record to the platform storage and returns a unique RecordID. |
| *ClearErrorRecord()* | Allows the caller to mark a record as consumed. The platform firmware may delete cleared records from the log using implementation dependent algorithms. |
| *GetErrorInfo()* | Provides info on the size of the log, quality of service, error signaling sources, threshold, severity support, severity escalation, and error types supported by the platform. |
| *SetErrorInfo()* | Allows the caller to set some of the capabilities returned via GetErrorInfo. |

*Fig. 4*

OS AND FIRMWARE COORDINATED ERROR HANDLING USING TRANSPARENT FIRMWARE INTERCEPT AND FIRMWARE SERVICES

FIELD OF THE INVENTION

The field of invention relates generally to computer systems and, more specifically but not exclusively relates to techniques for performing error handling using a coordinated approach employing operating system and firmware error handling facilities.

BACKGROUND INFORMATION

RAS (Reliability, Availability & Serviceability) is a critical requirement for enterprise class servers. System uptime is measured against the goal of "five nines", which represents 99.999% availability. The handling of soft errors to achieve this RAS goal is accomplished by addressing several different aspects of hardware and system software design, such as circuit and logic design, platform, firmware, and operating system (OS) design. The first priority is typically directed towards an attempt to minimize the actual occurrence of the soft errors at the hardware level within the practical constraints of device physics and logic/system design trade-offs. Automatic detection and correction of errors in hardware are the most preferred methods.

The occurrence of soft errors cannot be completely eliminated by good circuit design techniques, and at times, circuit design innovations are limited by practical bounds. In such cases, the most effective way to combat soft errors is to protect the processor internal structures, the memory subsystem, system bus, and I/O (input/output) fabric using various error protection, detection and correction techniques. Some of the most commonly used hardware techniques are through parity, ECC (error correction code), or CRC (cyclical redundancy check) protection schemes. When the detected software errors cannot be corrected by hardware through the above protection schemes, the responsibility of handling these errors is left to the system software with error log information provided by the underlying software layers. System hardware does not rely on software to actually correct the errors, but to take necessary corrective action from a software perspective (e.g., system reset, application termination, etc.)

Hardware error handling in most operating systems is a complex process today. The OS contains intelligence to parse some generic hardware error information based on standardized architecture registers or model specific registers (MSR's), classify the errors, and determine actions. However, the OS does not have intimate knowledge of the platform hardware topology and its register space, which would vary across different OEM's (original equipment manufacturer). Standardizing the platform hardware error registers is a possible solution. However, this solution requires both platform and processor hardware changes, and limits scalability, not to mention constant OS changes to support new platform capabilities that tend to evolve over time.

Some of the existing error handling architectures and implementations assume that certain system error functions are physically distinct and their scope is tied to either a processor or the platform. The error signaling and error reporting is tightly coupled to this structure and the OS is also expected to have the implied knowledge of what constitutes processor and platform functions. Due to integration of some of the platform hardware functions like the Memory Controller and North Bridge onto future processor sockets, the physical locality of the platform chip-set error entities are no longer deterministic across various implementations. This change in system design also requires an abstraction from an OS perspective. Therefore, it is desirable to abstract any implied knowledge of the underlying implementation in the separation of processor or platform error functions, from a system software viewpoint.

In addition, there are challenges due to different system software components managing errors for different platform hardware functions without any coordination with each other. Examples of this include error management through SMI— (System Management Interrupt) based firmware, system management controller (SMC) firmware, OS-based device drivers, etc. Some of these components are visible to the OS, while others are not.

Some of the errors managed by these platform entities may eventually get propagated to the OS level. Therefore, an OS is also expected to handle an assortment of hardware errors from several different sources, with limited information and knowledge of their control path, configuration, signaling, reporting, etc. This creates major synchronization challenges between different system software components. It would therefore be advantageous to have an architectural framework to facilitate coordination between the OS and other platform components for overall system error management.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 4 shows one embodiment of an EFI protocol interface structure used to facilitate OS access to firmware error-handling services

DETAILED DESCRIPTION

Figure 1:
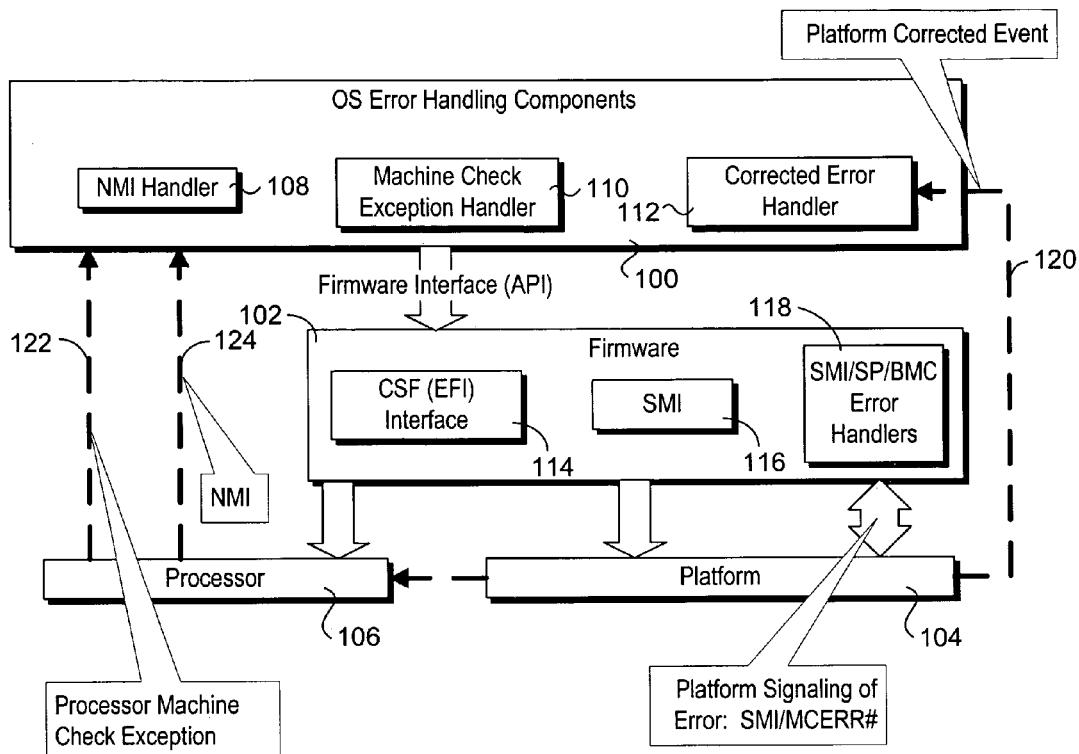
FIG. 1 shows system stack component interaction under one embodiment of a OS-firmware coordinated error-handling framework.

Embodiments of methods and apparatus for performing error handling using coordinated OS and firmware services are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

An accordance with aspects of the embodiments now described, error handling in response to machine errors is facilitated, in part, through the use of firmware facilities that enable various error-related services, such as error logging, to be performed by platform firmware in a manner that is transparent (i.e., hidden) to the operating system running on the platform. Subsequently, additional error handling may be performed by the OS using a firmware interface that enables information gathered by a firmware error handler service to be passed to the OS. The schemes minimizes fundamental processor hardware and architecture changes, and provides a flexible and scalable solution via firmware resources. The schemes also may be implemented to maintain backward compatibility with legacy architectures (e.g., the Intel x86 MCA (machine check architecture) architecture) and enables the new capability of firmware-based platform error handling through simple changes to the platform error signaling mechanism implementation and the firmware interface.

Under one aspect, during a generic processor hardware error event, control is passed to a generic OS handler. The generic OS error exception handler retrieves any error information from the architectural processor resources, such as MSR's, by directly accessing those resources. The foregoing OS functionality is complemented by an OS to CSF (Common System Firmware) or a shared memory region based mail-box or another mechanism to accomplish similar function, to get/set error information from the platform implementation specific error resources, such as configuration space registers (CSR's), in response to platform error events, platform firmware intercept of error events and an error signaling mechanism. The signaling of the errors and its handling is done in a variety of ways and is as described below, facilitating flexibility and scalability.

Based on the error type and platform implementation choice, error events may be signaled in one of the two following ways on the same platform:
1. Directly to the Firmware (Firmware Intercept Handling)
2. Directly to the OS (OS Intercept Handling)

Based on the signaling method chosen, the firmware gets control of the platform error handling at different points in time, as described below:
1. Firmware Intercept Handling: In this case the error event is first intercepted by the firmware through platform interrupts, the handlers for which will do the necessary pre-processing, before facilitating transfer of control to the OS. The error signaling to then redirected to the OS via firmware toggling of MCE/CPE (machine check exception/corrected platform error) signaling through some platform specific hardware hooks. The continuation of the error handling could then happen in the OS as described below in (2). Firmware intercept handling may be followed by the OS handling for the same event. In this case the firmware gets a second chance to do more error handling during an OS call back, which it may have deferred earlier. An example of firmware interruption for an error event is through mechanisms like SMI.
   a. Example Usage Model: When the memory image is corrupted, it is not safe to signal the error directly to the OS and have it execute the error handling code, but to let the firmware execute out of NVRAM (non-volatile random access memory) and take necessary correcting actions like: contain the error and attempt to enable a mirrored and uncorrupted image and then signal to the OS to take further actions.
2. OS Intercept Handling: In this scenario, the error event goes directly to the OS first as a result of hardware generated MCE or CPEI (corrected platform error interrupt) signaling without any firmware pre-processing or due to a firmware re-directed signaling as described above (1). When the OS does call into a platform CSF interface to get the error information, the firmware gets an opportunity to parse the platform error resources and do any necessary error processing without the OS's knowledge.
   a. Example Usage Model: When a multi-bit error is detected and contained during an IO (input/output) to Memory DMA (direct memory access), but is in a poisoned state in memory, the error may be signaled to the OS directly. The OS can retrieve the physical address of the error from the CSF interface and proactively attempt a recovery from the error by removing a page from circulation and/or possibly kill a process or reload a static image from the disk.

Both of these signaling modes can co-exist on the platform and the error event eventually becomes visible to the OS. The OS calls into the CSF interface to get the abstracted platform error information, formatted in a standard fashion. In addition to the platform error log information, the CSF interface can also return processor specific error information, which is above and beyond the coverage provided by the generic architected MSR's. In fact, there is nothing that precludes the firmware to provide the error information that is provided through the architecture MSR's as well.

Implementing the signaling mechanism for enabling firmware intercept and firmware-initiated MCE/CPEI signaling can allow the CSF to perform a variety of error handling functions behind the standard OS error handling for MCE and CPEI, depending upon the nature of the error and its severity. This way, the CSF always gets the first opportunity of platform error processing and handling as viewed from the OS level, but in an OS transparent manner. It is eventually the platform vendor who has the ability to decide on the error reporting and handling scheme at the platform level without expecting any new support from the OS, when any new error handling capabilities are enabled.

FIG. 1 shows system stack component interaction under one embodiment of a OS-firmware coordinated error-handling scheme. At a high level, the system stack includes OS error handling components 100, firmware 102, a platform 104, and a processor 106. The OS error handling components 100 include a non-maskable interrupt (NMI) handler 108, a machine check exception handler 110, and a corrected error handler 112. The firmware includes a CSF interface 114, a system management interrupt (SMI) firmware block 116, and firmware error handlers 118. In general, platform 104 is representative of various platform hardware components and add-on peripheral cards and devices, while processor 106 is illustrative of operations performed by a primary processor for the platform.

In one embodiment, the CSF interface 114 comprises an implementation of the Extensible Firmware Interface (EFI) (*Extensible Firmware Interface Specification*, version 1.10, Dec. 1, 2002). EFI enables firmware, in the form of firmware modules, such as drivers, to be loaded from a variety of different resources, including flash memory devices, option ROMs (Read-Only Memory), other storage devices, such as hard disks, CD-ROM (Compact Disk-Read Only Memory), or from one or more computer systems over a computer network. One embodiment of an implementation of the EFI specification is described in the *Intel® Platform Innovation Framework for EFI Architecture Specification—Draft for Review*, version 0.9, Sep. 16, 2003 (referred to hereafter as the "Framework"). It will be understood that embodiments of the present invention are not limited to the Framework or implementations in compliance with the EFI specification, but rather the employment of EFI for CSF interface 114 is merely illustrative of one framework for implementing such a firmware interface. Further details of an EFI implementation are discussed below.

In general, the configuration of firmware error handlers 118 will depend on the particular implementation. For example, under one embodiment an SMI-based error-handling scheme is implemented. Under other embodiments, the use of a service processor (SP) or baseboard management controller (BMC) is used to facilitate firmware-based aspects of the error-handling scheme. In some embodiments, an SP or BMC may be employed in conjunction with SMI firmware.

Figure 2:
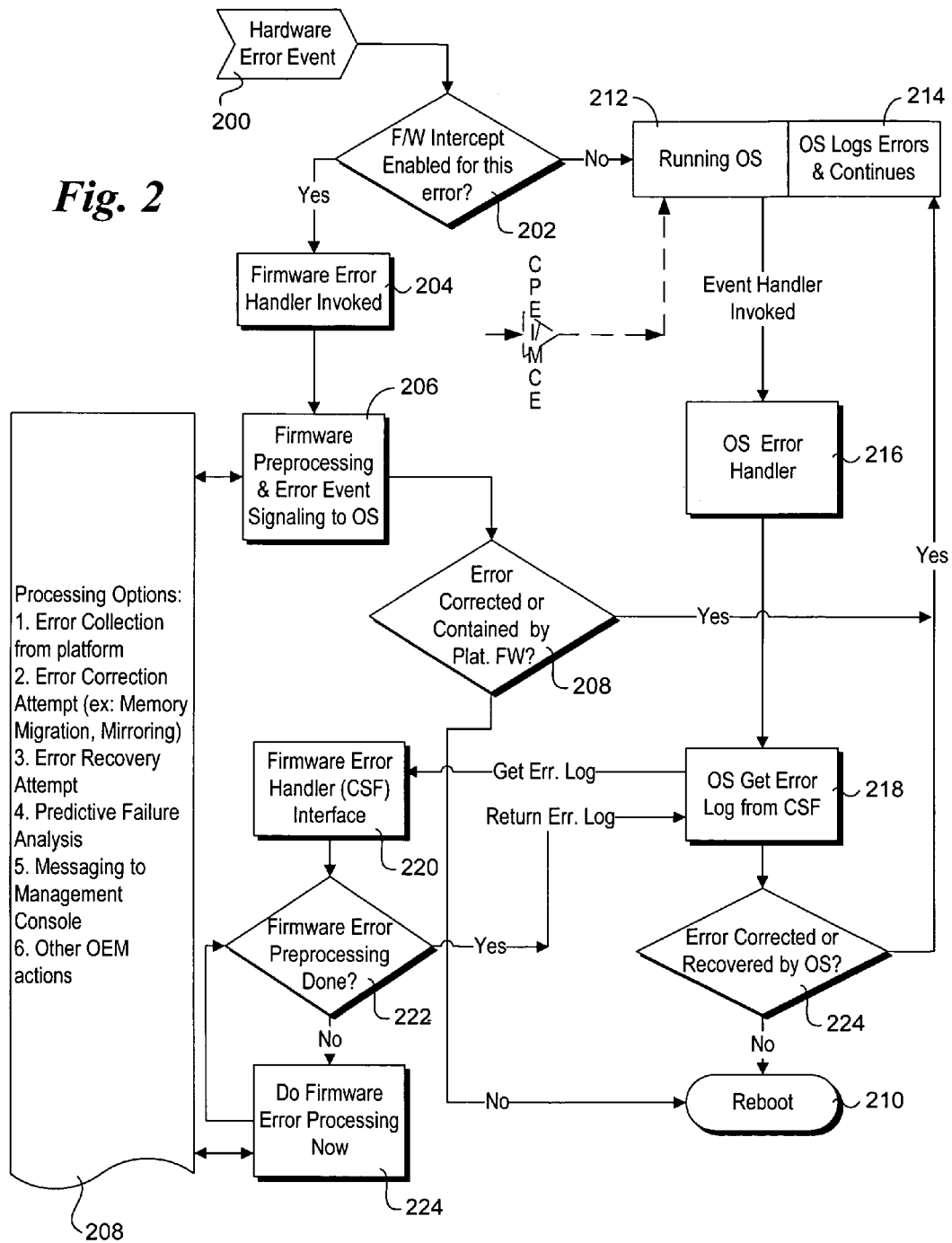
FIG. 2 is a flowchart illustrating operations and logic to facilitate a coordinated error-handling processes, in accordance with one embodiment of the invention.

With reference to the flowchart of FIG. 2, the process flow for one embodiment of an error-handling process employing a transparent firmware intercept proceeds as follows. The process is initiated by a hardware error event 200. The hardware error event will typically be detected by either platform 104 (e.g., by a platform hardware component itself) or processor 106. In either case, an error type is ascertained, and a determination is made in a decision block 202 to whether a firmware (F/W) intercept is enabled for the error type. For example, the firmware can be configured such that certain predetermined error types are intercepted, while others types are ignored (by the firmware), with the error handling being passed directly to the OS. In the firmware intercept case, a firmware error handler is invoked in a block 204, and firmware preprocessing and error event signaling to the OS is performed in a block 206. Typically, the firmware error handles 118 will include various error handlers for performing specific error handling tasks. Accordingly, in conjunction with invoking the firmware error handler in block 204, a mechanism is employed to determine which firmware error handler is to be called.

Various firmware processing options, including firmware preprocessing operations for block 206, are shown in a list 208. These include but are not limited to:
1. Error Collection from platform.
2. Error Correction Attempt (e.g., Memory Migration, Mirroring).
3. Error Recovery Attempt.
4. Predictive Failure Analysis.
5. Messaging to Management Console.
6. Other OEM actions During typical firmware preprocessing operations in block 206, options 1, 2, and/or 3 may be performed. At the conclusion of the preprocessing operations, an appropriate error event signal is provided to the OS, also depicted in block 206. The error event signal is akin to a signal the OS might typically see had the firmware intercept of the error event not have been performed. Furthermore, from the perspective of the OS, the firmware intercept and preprocessing operations are transparent.

In a decision block 208, a determination is made to whether the error was corrected or contained by the platform firmware. In some instances, a "fatal" error will be encountered that cannot be corrected or handled by the firmware (or OS for that matter). Under this situation, a reboot will be necessary to correct the system state, as depicted in a continuation block 210.

Depending on the selected preprocessing operations and/or the results of such operations, various signaling scheme may be employed to pass control to the OS. For example, if the error is corrected during these operations, a platform-invoked CPEI event signal 120 may be provided to corrected error handler 112, as shown in FIG. 1. In another instance, the error signaling is propagated from platform 104 to processor 106 to OS error handling components 100, such as through a processor MCE 122 or an NMI 124. The use of an MCE or NMI may also be used to directly initiate OS-based error handling in the event a firmware intercept is not applicable for decision block 202.

In either of these instances, error event handling is passed to a running OS 21. In the event preprocessing was performed by the firmware, the OS may log errors previously stored by the firmware service using CSF interface 114, as depicted by a block 214 and described below in further detail. This may complete the OS error handling operations, or further operations may be performed.

In the cases of further operations being performed or having the error event directly passed to the OS, an appropriate OS error handler is invoked, and the OS error handler is executed in a block 216. At this point, the (remaining) error handling may be entirely performed by the OS, or it may leverage firmware error handling facilities that are accessed via CSF interface 114. In one aspect, the OS may request the firmware to gather error information and returned it to the OS so that it may be logged or otherwise used for various purposes. The OS-side aspects of this operation are depicted in a block 218, and is initiated by the OS by submitting a request via CSF interface 114 to obtain error log information. In response, an appropriate firmware error handler 118 is invoked to handle the request, as depicted in a block 220.

In a block 222, the firmware error handler determines whether firmware error preprocessing for the instant error event has been previously performed (e.g., in the manner discussed above). If so, the error information collected from the platform is returned to the OS in block 218 via CSF interface 114. If not, firmware error processing is performed in a block 224, and the results are returned to the OS via the CSF interface.

Upon receiving the error log information, the OS error handler may attempt to correct the error or recover from an error state. As depicted by a decision block 224, if the OS-based error correction/recovery is successful, the logic returns to block 214 to log the error and continue OS runtime operations. If the error state cannot be recovered from, a reboot (block 210) will be required.

OS-Platform Interface

The platform firmware supports an Interface or a set of APIs to manage the error resources. This interface may be implemented with any standard system firmware, which the OS can call at runtime in virtual operating mode. In one embodiment, the interface is architected into the OS. For the described interface below, EFI is used as a reference system firmware with an API. However, other firmware interfaces may also be used.

The architecture allows for several different types of records to be managed by the OS with firmware coordination. The types of records include: Error Records, Platform Capability Records and OS or OEM specific Records. Error records are related to different error events, where as Capability records are used for platform configuration by the OS. The OS/OEM specific data is any type of data that the OS/OEM desires to save to the platform's non-volatile memory (NVM), the data format of which is OS implementation specific. The data or section body associated with the OS/OEM record is viewed as raw data from the platform perspective.

Figure 3:
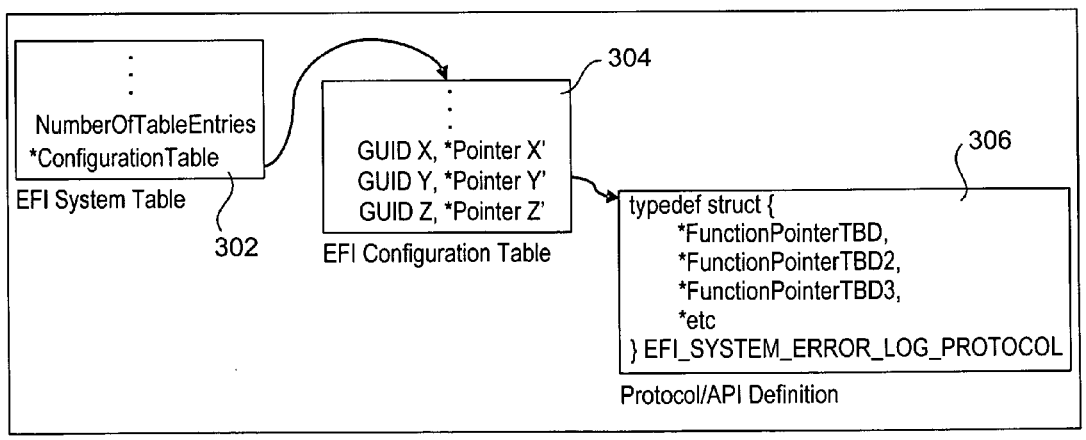
FIG. 3 shows one embodiment of an EFI error protocol structure.

An EFI error protocol instance is a means of describing a set of APIs. The EFI protocol definition represents a structure defining a series of entries that consist of data as well as pointers to functions. One embodiment of an EFI error protocol structure 300 is shown in FIG. 3. The illustrated components of the structure include an EFI System Table 302, an EFI Configuration Table 304, and a protocol/API definition 306.

During platform initialization, the system software or OS walks through the EFI System Table 302 to locate the EFI Configuration Table 304, which consists of a series of GUID (Globally Unique Identifier)/pointer pairs. One of the GUID/pointer pairs in the EFI Configuration Table 304 will correspond to an EFI_SYSTEM_ERROR_LOG_PROTOCOL entry, which in turns corresponds to the virtual/physical function pointer for the CSF API.

Further details of an exemplary System Error Log protocol interface structure are shown in FIG. 4. In one embodiment, the API services (i.e., functions) includes a GetErrorRecord( ) service, a SetErrorRecord( ) service, a ClearErrorRecord( ) service, a GetErrorInfo( ) service, and a SetErrorInfo( ) service.

This protocol (API) is produced (via EFI) by the platform firmware during platform initialization and gives higher-level software access to a non-volatile error log managed by the platform firmware. The System Error Log protocol allows the platform to export a non-volatile error log for use by higher-level software, such as an OS, which is the primary target of this log. The member functions follow the same rules as the EFI Runtime Services when being called by the OS in virtual or physical mode. Prior to the OS calling the EFI Runtime Service SetVirtualAddressMap( ), the member functions of this protocol are called from physical mode. After SetVirtualAddressMap( ) is called, the member functions may be called in virtual mode with the mappings provided by the SetVirtualAddressMap( ) call.

As part of a legacy or a firmware handling mode, both corrected and uncorrected errors are signaled and the error information is reported to the OS. The platform interface may provide error handling in firmware in an OS transparent manner. In addition, the OS may provide additional error handling capabilities, to complement the firmware's handling of the same.

The OS error model can be defined by a centralized OS policy engine implementation, which in turn can act as a proxy for any platform/OEM suggested or negotiated policies. In accordance with basic configuration operations performed during OS initialization, an OS may determine which error information would be accessed by it directly or obtained through the firmware interface, and set the policy accordingly. In addition, the OS will initialize various error structures for the configuration capabilities they support or use the default values as set by the platform.

The OS can do the platform configuration statically during the system initialization time or dynamically at runtime. The dynamic runtime configuration can be in response to certain system event conditions and an action driven by the OS policy engine. An example of this is a scenario of the system flooded with continuous stream of corrected error interrupts (e.g., CPEI) and the OS threshold policy for this notification type decides to turn off the interrupts to use a polling mode. In one embodiment, the OS uses the GetErrorInfo( ) and SetErrorInfo( ) API calls to configure the platform for various attributes.

Figure 5:
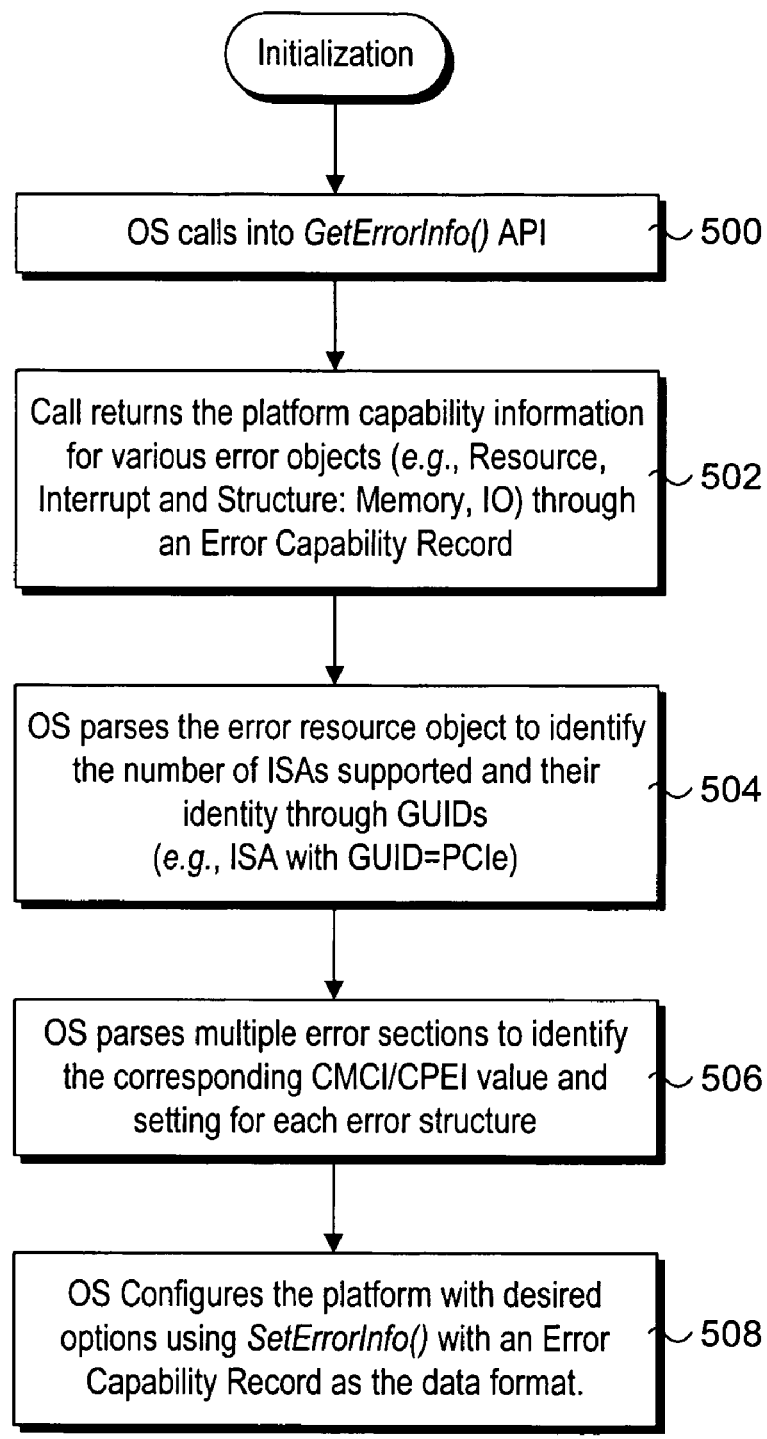
FIG. 5 is one embodiment of a flowchart illustrating operations performed to set up a firmware interface to support OS or System Software runtime access to an error-handling services interface.

An overview of the operations for the boot and runtime configuration through the firmware interface is illustrated by the flowchart of FIG. 5. During initialization, the OS calls into the GetErrorInfo( ) API in a block 500. In a block 502, the call returns the platform capability information for various error objects through corresponding Error Capability Records. The OS them parses the error resource object to identify the number of ISA's supported and their associated GUID identities, as depicted in a block 504. In a block 506, the OS parses multiple error sections to identify the corresponding CMCI/CPEI value and setting for each error structure. The process in completed in a block 508, wherein the OS Configures the platform with desired options using the SetErrorInfo( ) call with an Error Capability Record as the data format.

Corrected Error Handling

Corrected errors are the simplest to handle. Since the error has already been corrected, the OS only needs to respond to the event and record the error in its persistent storage. Optionally, the OS may perform error failure analysis, future error prediction, etc., based on the corrected errors. It is therefore desirable for the OS to log the errors in an architected manner to its event log, so that other utility software that parses the OS event log can easily interpret it. It is possible for the OS to get the notification of the corrected error either through an interrupt or by polling and it can choose to disable interrupt notification as a policy at any time, which includes boot initialization and runtime enable/disable.

In one embodiment, the OS handles two types of corrected errors: CMC (Corrected Machine Check) scope (typically belonging to the processor socket) and CPE scope (tied to platform components external to the processor socket). The firmware handling mode configuration setting determines how these errors are signaled, the scope to which they belong, and their reporting to the OS. The CMC or CPE scope is defined to make platform implementations more flexible and hence have no impact on the OS functionality, other than to use it as an input argument when calling platform firmware for error logs. CMC and CPE scope errors are notified through CMCI and CPEI interrupts, respectively.

Figure 6A:
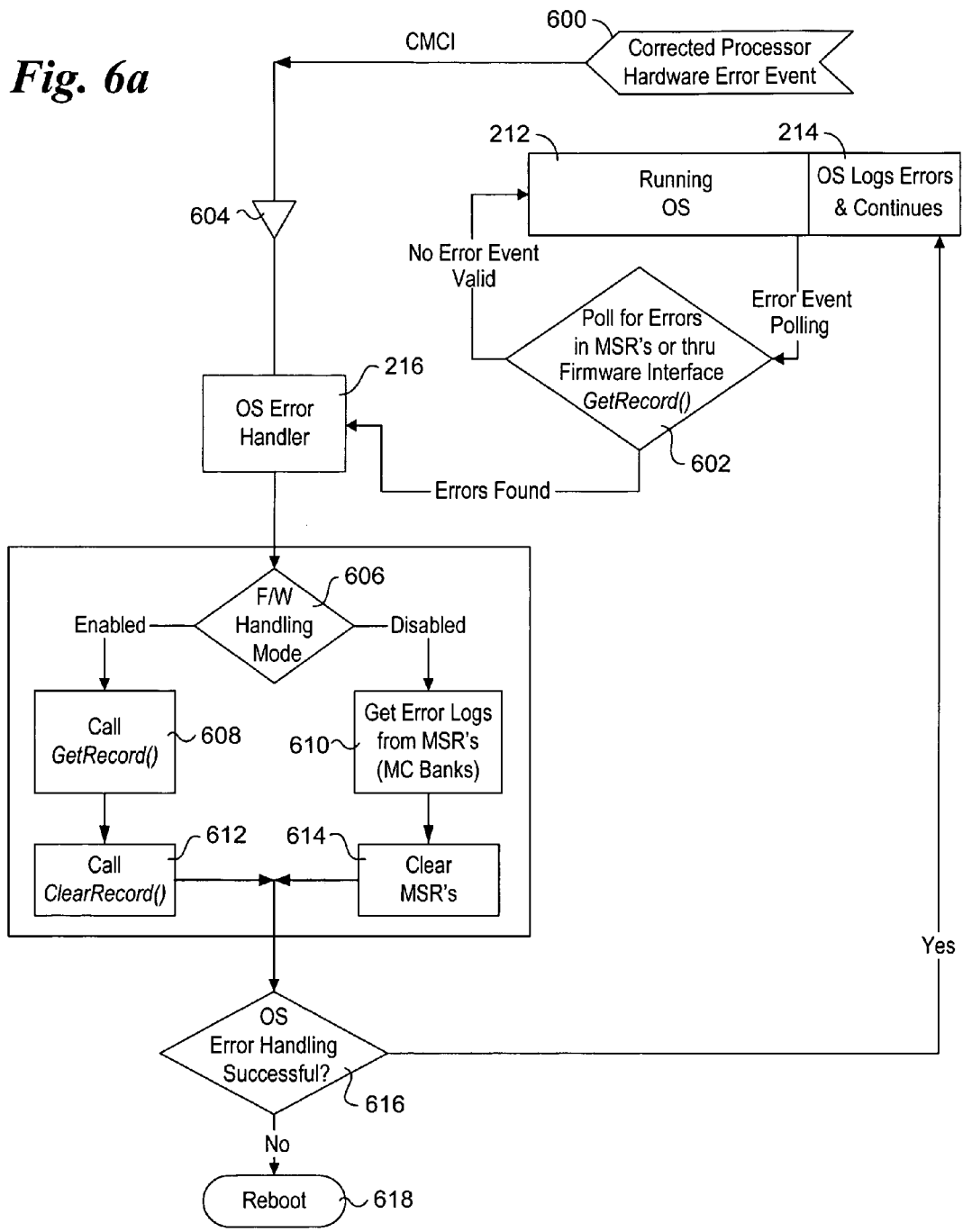
FIG. 6a is a flowchart illustrating operations and logic performed during processing of a corrected processor hardware error event, according to one embodiment.

FIG. 6a shows one embodiment of an OS corrected CMC scope error flow. The process begins at an event 600 corresponding to the processor hardware detecting a corrected error. In response, the processor hardware logs the error information in its MC banks. Meanwhile, the OS can be notified of event 600 through one of two means: period polling, or through a CMCI interrupt. These are respectively depicted in FIG. 6a by a decision block 602 (with corresponding polling loop) and a CMCI interrupt 604. Under one embodiment of the polling scheme, the OS periodically polls the MC banks for valid corrected errors or polls through the GetErrorRecord( ) interface.

In response to an error found through polling or a CMCI interrupt, the process proceeds to OS error hander block 216. As before, the OS logs any valid information on the interrupted processor(s), as applicable. As depicted by a decision block 606 and a block 608 if the firmware handling mode is enabled, the OS may call GetRecord( ). Otherwise, if the firmware handling mode is disabled, the OS can get error information from the processors MSR's (e.g., MC banks), as depicted in a block 610.

Next, the OS clears the error log. This may be performed by calling the ClearRecord( ) API with the RecordID as it argument, as depicted in a block 612 or the OS clears the applicable MSR's, as depicted in a block 614.

As depicted by a decision block 616, if the OS error handling is successful, the OS logs the error and continues at block 214. If the error handling is not successful, the platform is rebooted at continuation block 618.

CPE Scope errors typically originate from platform chipset components that are not integrated onto the processor socket. The error event notification and error log reporting to OS is only available when the OS configures the firmware handling mode enabling for these errors. This type of error can be notified either through an interrupt (CPEI) and or through polling via the GetErrorRecord( ) interface. The details of the interrupt vector chosen for CPEI and the platform's desired destination processor for the interrupt handling service is specified through the existing ACPI (Advanced Configuration and Power Interface) platform interrupt source structure definition in the MADT (Multiple APIC Descriptor Table).

When the OS uses the polling option for the CPE Scope corrected error event, it calls the platform interface on any one or all of the processors on a partition depending on the Local/Global Scope platform capability, to check for a valid event through GetErrorRecord( ), with Corrected CPE Scope error as its input argument. If polling is employed, the frequency of polling is an OS implementation option.

The most common source of CPE Scope corrected errors are 1-bit ECC (Error Correction Code) errors related to soft or transient memory errors. This is usually corrected by the 1-bit error correction or double bit error detection feature of the memory controller. The OS has several strategies for handling excessive CPEI interrupts, such as threshold setting or polling. The two aspects of the CPE Scope corrected error handling are error event notification and reporting for both ISH and ISA errors.

Figure 6B:
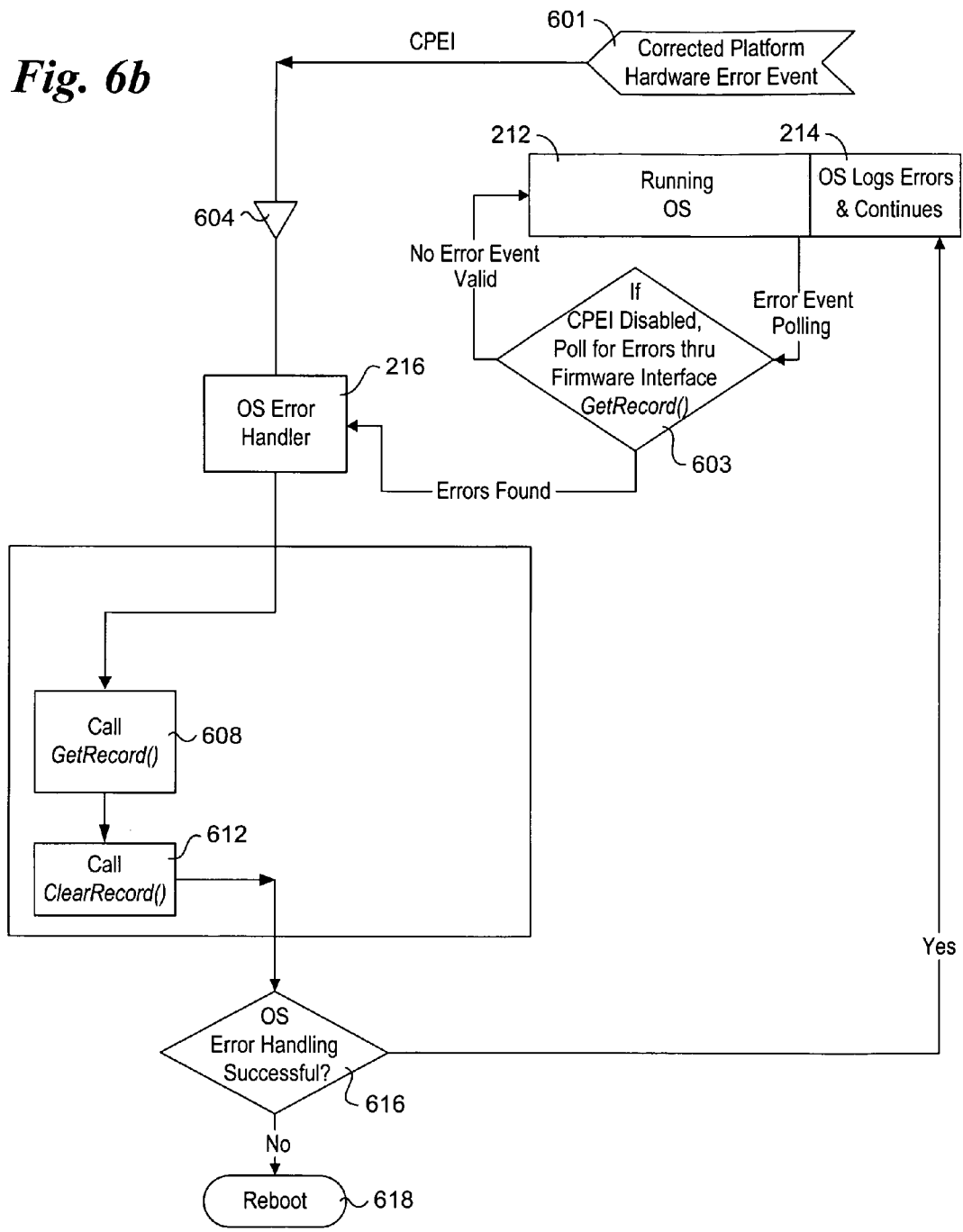
FIG. 6b is a flowchart illustrating operations and logic performed during processing of a corrected platform hardware error event, according to one embodiment.

One embodiment of an OS Corrected CPE Scope error flow is shown in FIG. 6b, wherein like-numbered blocks perform similar operations to those described above with reference to FIG. 6a. The error flow of FIG. 6b assumes that the firmware handling mode is enabled. The process starts at an event 601 corresponding to the platform hardware detecting a corrected error. In response to the event, the platform hardware logs error information in its implementation specific registers. If CPEI is enabled, the platform hardware may assert a CPEI 605 to notify the OS of the corrected error event. Otherwise, if CPEI is disabled, the OS may be notified of the event through polling using the EFI GetRecord( ) API, as depicted by a decision block 603 and associated loop.

As before, the OS acquires error log information using the GetRecord( ) API in block 608, and clears the error log using the ClearRecord( ) API in a block 612. If the OS error handling is successful, the OS logs the error and continues at block 214. If the error handling is not successful, the platform is rebooted at continuation block 618.

Uncorrected Error Handling

Uncorrected errors for both Recoverable & Fatal error types are notified through a machine check exception (MCE) to the OS, with no distinction between processor- or platform-generated error paths. The most common legacy OS usage model for these errors is to cause a system reset and log the errors on subsequent reboot.

Notification of uncorrected errors to the OS through polling is not an option, as that could lead to error propagation across the system and results in silent data corruption issues. Instead, uncorrected errors are reported through a unified uncorrected error record. The OS parses the error logs to identify the source of the error and isolate it down to the particular error function. In the case of uncorrected fatal errors, the processor or platform would have lost critical state information and the only recourse is to reboot the machine. To record the fatal error details, the firmware must be capable of storing the error records across OS boots, in a platform specific non-volatile storage area such as flash memory.

Figure 6C:
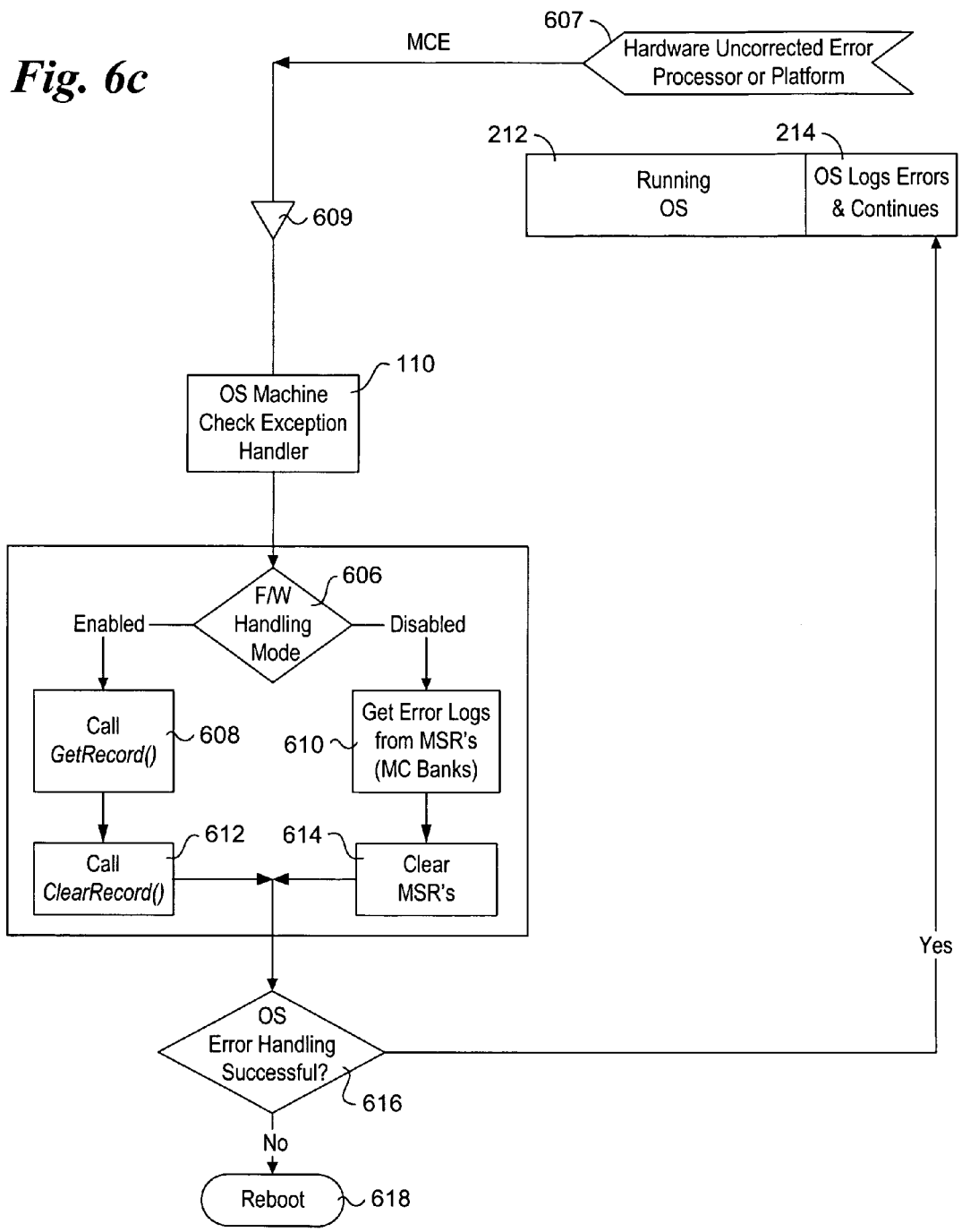
FIG. 6c is a flowchart illustrating operations and logic performed during processing of an uncorrected processor or platform hardware error event, according to one embodiment.

One embodiment of an OS uncorrected error flow is shown in FIG. 6c. The process starts with an uncorrected error event 607 detected by the processor of platform. In response, the hardware logs the error information in its MC banks (for MCB uncorrected errors) or in its implementation specific hardware. The OS then gets notified of the uncorrected error via an MCE 609. In one embodiment employing Intel® Xeon™ processors, an MCE is invoked by enunciating the Int-18 line for the processor.

In response to the MCE, the OS launches its machine check exception handler 110. This exception hander then employs the GetRecord( ) and ClearRecord( ) APIs in blocks 608 and 612 if the firmware handling mode is enabled; otherwise it gets the error logs from the processor MSR's in block 610 and clears the MSR's in block 614 in the manner described above. If the OS error handling is successful, the OS logs the error and continues at block 214. If the error handling is not successful, the platform is rebooted at continuation block 618.

For MCB uncorrected errors, the detection and notification of the uncorrected errors can be done by any one of the processor internal arrays, namely: Cache, TLB, Bus, System Interconnect, etc. In all of these cases, the OS would be able to get the error logs from the processor architectural MC Banks (when implemented with a processor that provides such an architecture). The MCA error codes are architecturally defined as part of the processor architecture (under various embodiments), by means of which the OS can determine the source of the error structure. In some processor implementations, the contents of the MC Banks are sticky (i.e., non-volatile) across resets. This is helpful for situations when the OS has a fatal error and cannot advance past the entry point in the MC Exception handler, to be able to log the errors to the OS event log.

The detection and reporting of the uncorrected errors is done by any one of the platform error structures, namely:

Memory Controllers, IO, etc. In all of these cases, the OS, by itself, would not have visibility into non-architectural platform hardware registers to get the error logs. For the industry standard architecture error interfaces, the OS implementation may not have any native support.

Under other aspects of the embodiments, a abstracted mechanism is provided for accessing and managing platform hardware. In the Intel® Active Management Technology (Intel AMT or iAMT) architecture, a service or management engine/processor (ME) or baseboard management controller (BMC), or other firmware partition (e.g., accessed via system management mode (SMM) or using a dedicated management core in a multi-core processor) resides on the platform and autonomics and management capabilities are run on this SP/BMC/SMM. Information about the different devices on the platform is exposed via a common, secure and extensible interface—the Sensor Effector Interface (SEI). By defining a common platform interface, the SEI allows downloadable Capability Modules (CMs) (scripts and programs) running on the SP/BMC/SMM to access a single interface for managing many different devices and instruments on the host platform. As part of the SEI, Resource Data Records (RDRs) are used to accurately discover, identify, and describe all manageable platform resources.

Figure 7:
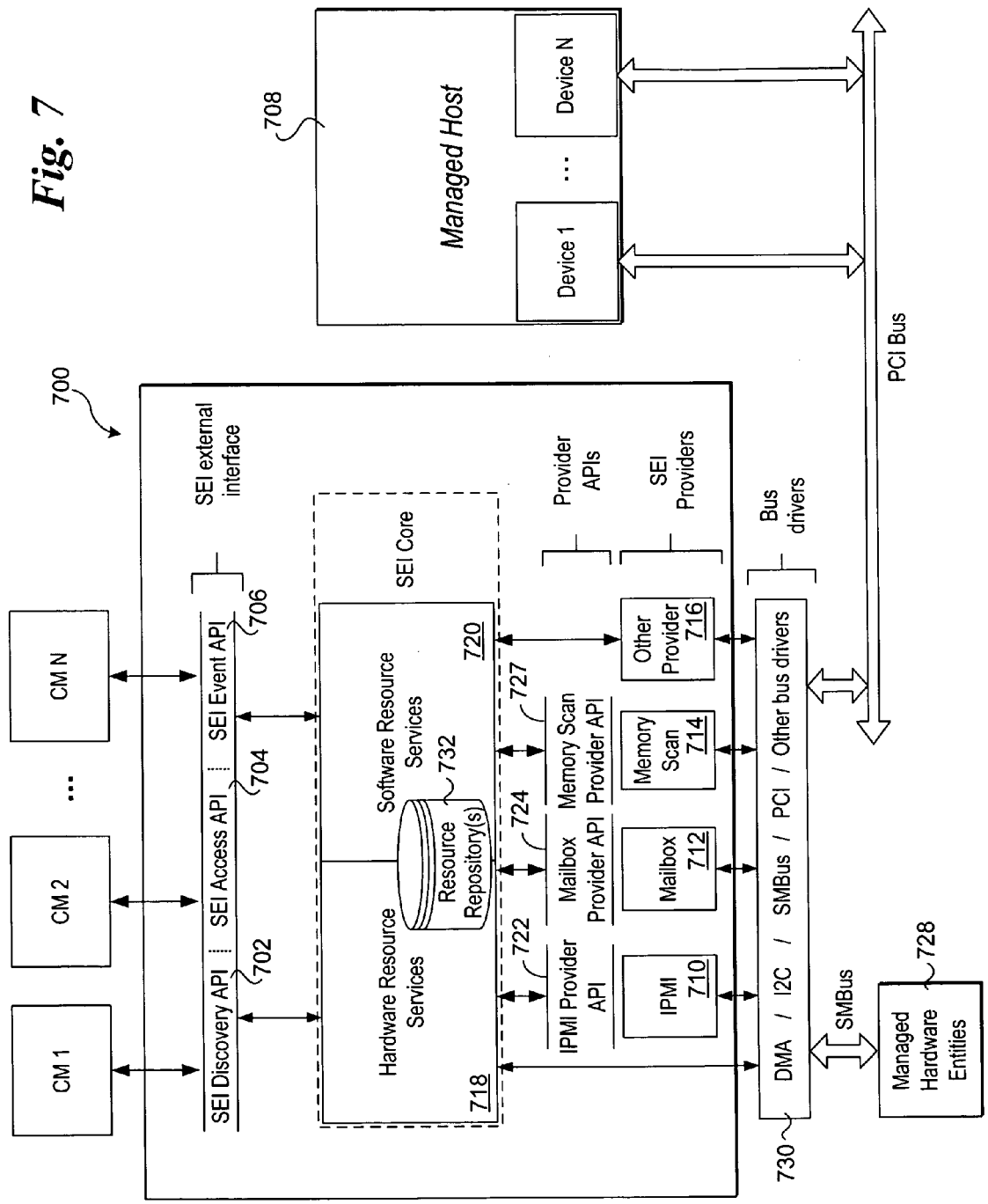
FIG. 7 is a schematic diagram illustrating the various interfaces and components of a Sensor/Effector Interface (SEI) subsystem.

FIG. 7 shows details of the SEI subsystem 700 (also referred to as the Sensor/Effector and Provider subsystem) including the providers and common programmatic interfaces which sandwich them. The SEI subsystem provides a modular and extensible mechanism for managing platform hardware and software. Specifically, the SEI external interface, which includes the SEI Discovery API (application program interface) 702, the SEI Access API 704, and the SEI Event API 706, provides a common mechanism for interacting with managed hardware and software components on the host platform (managed host 708). The Provider portion of SEI subsystem 700 incorporates various drivers (providers) for interacting with the platform hardware to support access to and manipulation of management-related information. These providers are depicted as an IPMI (Intelligent Platform Management Interface) provider 710, a mailbox provider 712, a memory scan provider 714, and other providers 716, which are not specifically identified. Each of these providers is permitted access to hardware resource services 718 and software resource services 720 via a respective API, including an IPMI provider API 722, a mailbox provider API 724, and a memory scan provider API 726. Meanwhile, each of the SEI providers is enabled to access managed hardware entities 728 and managed host devices 1-N via appropriate bus drivers 730, which may include but are not limited to a DMA (direct memory access) driver, an I2C bus driver, an SMBus driver, and a PCI bus driver.

The SEI provides a common abstraction of manageable platform features. By defining a common platform interface, SEI allows embedded capabilities to access a single interface for managing the host platform. Through this interface, embedded capabilities can discover and identify all manageable platform devices and firmware components, read their sensor data, configure their effectors, and handle events generated by the managed entities. The SEI also accommodates controlled access to manageable platform features, determining which capabilities can access which manageable platform features, and ensuring safe access to those features when permitted. The SEI aggregates data provided by the SEI providers that interact with the host platform, implementing code that can safely access the platform's manageable features and translating the managed data into a form that is consistent with the common SEI abstraction. The SEI also provides a framework such that modular and device independent code can be interpreted and run within this framework. This interpreted code, which may be loaded from option ROMs, may interact with the well-defined SEI interfaces, and, thus, perform its logic functions while interacting with the rest of the SEI subsystem and the components running therein.

Additionally, the SEI defines intra-platform message formats, namespaces and record formats that can fully describe and address the manageable components of a platform. Where legacy technologies exist that have different message formats and namespaces, the SEI provider subsystem can be used to map those protocols into the common SEI abstraction. The SEI facilitates secure access to manageable entities by supporting access-control mechanisms, including controlling access requests down to the managed-resource method level. For example, a command write to a particular effector instance could be allowed, but a change to the effector's default start-up value from the same source could be denied.

Under the SEI definitions, a managed resource is any managed entity, individual sensor/effector, or other components that is described by a Resource Data Record (RDR). An entity is a device or other logical grouping of sensors and effectors that contains a description of the device or logical entity and its fully qualified path. A sensor is a read-only resource that produces an output. An effector is a controller resource that takes one or more commands, institutes a change to the managed system and produces an output. An RDR is a descriptor for a particular instance of a managed resource that provides its identity, data type, description, data format conversions, access method and other attributes needed to discover, access, and control the managed resource.

The various SEI interfaces are run-time linkable and can bind a provider to the SEI core (via the Provider APIs) and the appropriate bus driver (via the bus driver interfaces) for accessing the device. The SEI core is responsible for storing all the RDRs collected by the providers during discovery in a resource repository 732. The SEI core uses these RDRs to associate requests from CMs to a particular sensor or control that is accessed through the associated provider. Since these programmatic interfaces are all run-time linkable, a provider can be installed at any time, bond to its selected bus driver and to the SEI core, communicate with its associated device(s) via the bus drivers, and finally the installed provider can populate the SEI core with the appropriate RDRs for its device(s). At this point, downloadable CMs (depicted as CMs 1-N) may access the sensors and controls for that device, gather device inventory information, register for and receive events from the device, and identify the device, its version and type information.

In accordance with aspects of the embodiments described herein, the IMPI/SEI interfaces may be employed to facilitate access to and correction of platform hardware via firmware facilities (e.g., firmware 102). This access mechanism enables error correction to be performed in an OS-transparent manner, while providing additional management and correction capabilities that are not supported by conventional OS platform management architectures.

Figure 8:
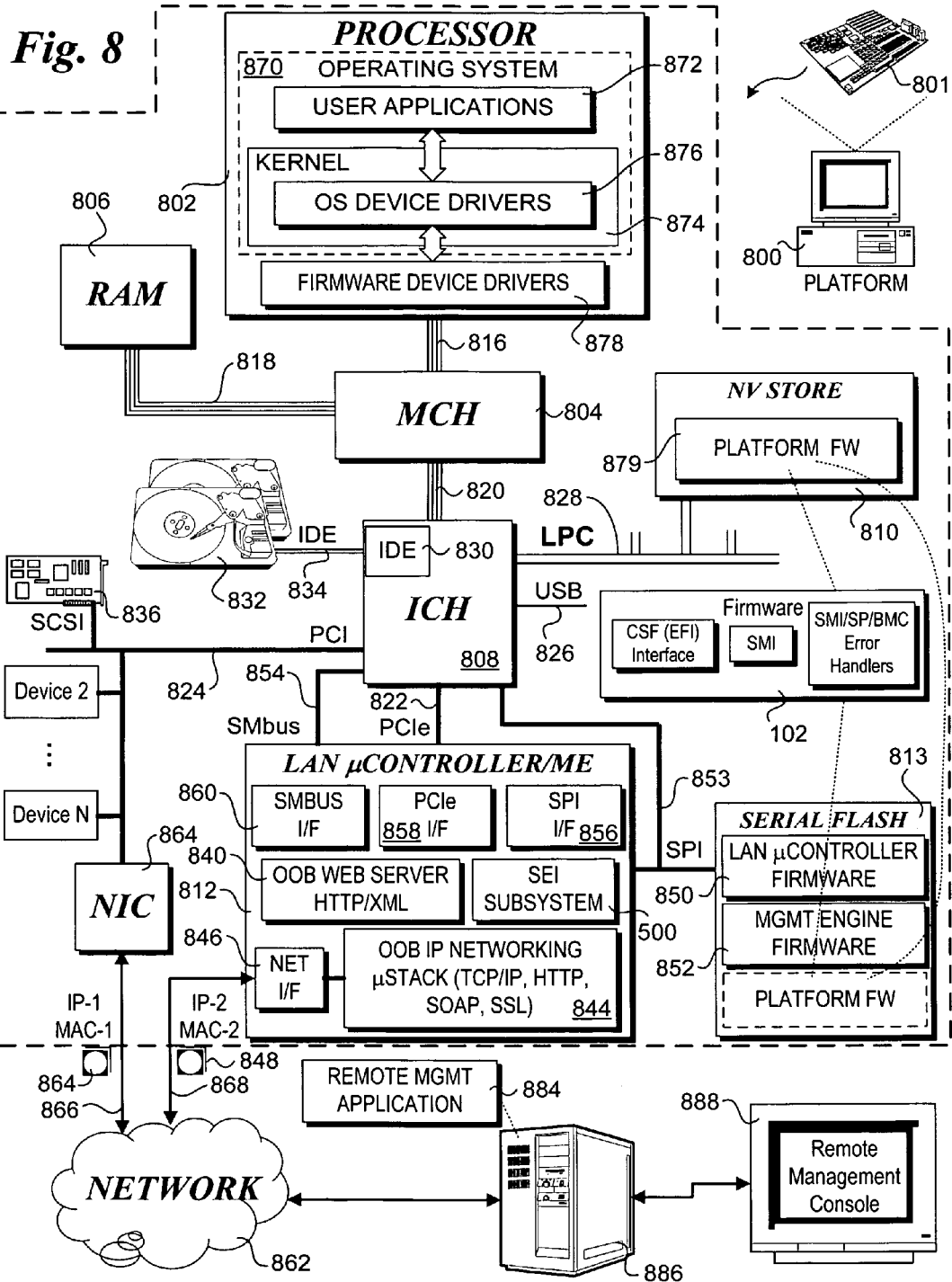
FIG. 8 is a schematic diagram of a platform architecture used to perform coordinated error-handling aspects of the embodiments described herein.

FIG. 8 shows a system architecture for a platform 800 that may be used to implement aspects of the error-handling techniques discussed herein. The architecture includes various integrated circuit components mounted on motherboard or main system board 801. The illustrated components include a processor 802, a memory controller hub (MCH) 804, random access memory (RAM) 806, an input/output (I/O) controller hub (ICH) 808, a non-volatile (NV) store 810, a local area network (LAN) microcontroller (μC)/ME 812, a serial flash chip 813, and a network interface controller 814. Processor 802 is coupled to MCH 804 via a bus 816, while MCH 804 is coupled to RAM 806 via a memory bus 818 and to ICH 808 via an I/O bus 820.

In the illustrated embodiment, ICH 808 is coupled to LAN microcontroller/ME 812 via a peripheral component interconnect (PCI) Express (PCIe) serial interconnect 822 and to NIC 814 via a PCI bus 824. The ICH may also be connected to various I/O devices via corresponding interfaces and/or ports. These include a universal serial bus (USB) port 826, and a low pin count (LPC) bus 828. In one embodiment, NV store 810 is connected to ICH 810 via LPC bus 828. In another embodiment (not shown), the elements of ICH 808 and LAN microcontroller/ME 812 are implemented in a single component.

In the illustrated embodiment, ICH 808 further includes an embedded integrated drive electronics (IDE) controller 830, which, in turn, is used to control one or more ATA IDE (or Enhanced IDE—EIDE) disk drives 832 that are connected to the controller via an IDE interface 834. IDE controllers and IDE disk drives are the most common type of disk drive and controller found in modern PCs and laptop computers. Generally, in addition to the configuration shown, a separate (from ICH 808) IDE controller may be provided for controlling an IDE disk drive. In some embodiments, a SCSI controller (or other type of mass storage device controller) is used in place of or in addition to IDE controller 830. In general, the SCSI controller may be a build-in controller or coupled to an expansion bus as an add-on peripheral card, such as a SCSI controller PCI card 836 coupled to PCI bus 824.

LAN microcontroller/ME 812 is configured to perform various operations that are facilitated via corresponding functional blocks. These include an out-of-band (OOB) Web Server 840, an SEI subsystem 700, and an OOB Internet Protocol (IP) networking microstack 844. The OOB Web server 840 and OOB IP networking microstack 840 supports IP networking operations that enable external devices to communicate with LAN micro-controller/ME 812 via a conventional Ethernet connection using Web services facilitated via XML (Extended markup language) sent via HTTP (Hypertext transport protocol). Accordingly, LAN micro-controller/ME 812 also provides a LAN µC network interface 844 that is connected to a platform Ethernet port 846.

Figure 9:
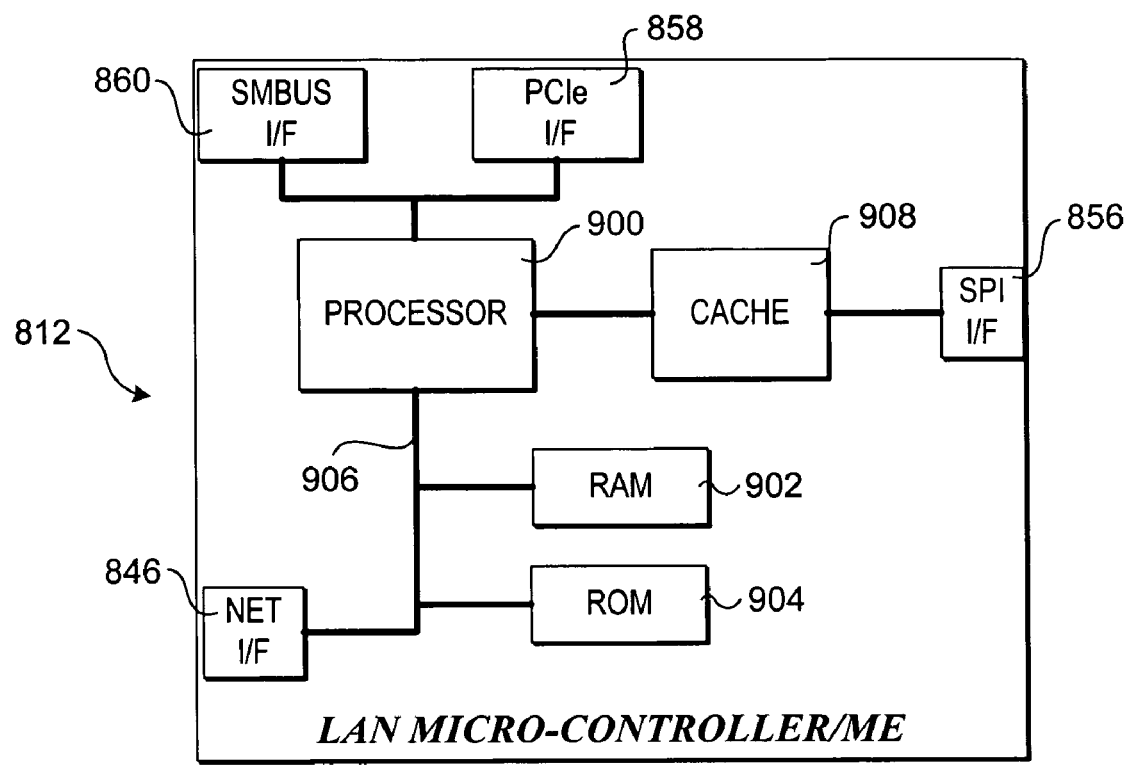
FIG. 9 is a schematic block diagram illustrating components of a LAN microcontroller and management engine used in the platform architecture of FIG. 8.

To effectuate the operation of its various functional blocks, LAN microcontroller/ME 812 loads LAN microcontroller firmware 850 and management engine firmware 852 from serial flash chip 813 and executes the firmware instructions on its built-in processor. (Details of the LAN microcontroller/ME hardware architecture are shown in FIG. 9 and discussed below.) In one embodiment, the transfer of data from serial flash chip 813 to LAN microcontroller/ME 812 is sent over a Serial Peripheral Interface (SPI) 853. In one embodiment, LAN microcontroller/ME 812 is also coupled to ICH 810 via SPI 853 in addition to PCIe interconnect 822. Furthermore, in one embodiment LAN microcontroller/ME 812 is coupled to ICH 810 via an SMbus 854. Communications via SPI 853 are facilitated by an SPI interface (I/F) 856, while communications via PCIe interconnect 822 are facilitated by a PCIe interface 858, and communications via SMbus 854 are facilitated by an SMbus interface 860.

Under conventional usages, the managed client is enabled to connect to a computer network 862 via a platform NIC Ethernet port 864, which is internally connected to NIC 814. To facilitate concurrent and separate usage, each of platform NIC Ethernet port 864 and LAN µC Ethernet port 848 have respective media access control (MAC) addresses and respective IP addresses. For simplicity, the respective MAC addresses are depicted as MAC-1 and MAC-2, while the respective IP addresses are depicted as IP-1 and IP-2. In general, NIC Ethernet port 864 and LAN µC Ethernet port 848 support respective network links 866 and 868 to network 862 using conventional LAN operations and protocols.

Processor 802 is shown running an operating system 870 including an OS kernel 872. The operating system hosts various user applications 874 running in the OS's user space. The OS kernel includes various OS device drivers 876. The OS device drivers are used to support communication with corresponding hardware devices and peripherals, such as IDE drives 832 and SCSI controller 836. Typically, corresponding firmware device drivers 878 comprising a portion of platform firmware 879 are employed in a firmware layer to support "low-level" device functions, while providing abstracted interfaces to corresponding OS device drivers. Under various embodiments, portions of the platform firmware, including firmware 102, may be stored in NV store 810 and/or serial flash 813.

An operating system 870 is run on processor 802 to support OS runtime facilities, including support for execution of user applications 872. The OS includes an kernel 874 that employs various OS device drivers 876 to perform the OS-side of error handling operations described herein. Various firmware device drivers 878 are also provided in the firmware layer to support various operations and interfaces, including building the EFI framework during platform initialization.

In accordance with further aspects, platform implementations that include LAN microcontroller/ME 812 may provide additional error-handling and reporting capabilities. Under one scheme, error logs and the like are made available to a remote management application 884 running on a remote management server 786 that is connected to network 862. The remote management application issues various management requests and commands to platform 800 using an out-of-band communication channel facilitated by LAN microcontroller/ME 812. The terminology "out-of-band" refers to a condition where the operating system running on platform 800 is unaware of the existence of the OOB communication channel or any of its functions. Moreover, OOB communications between managed host 800 and remote management server 886 may occur concurrently with in-band network communications that are sent to various computers and servers coupled to network 862 via network link 866. Such in-band communications are managed and controlled by operating system 870.

Upon receipt of a SOAP/XML message via the OOB communication channel, the message is processed by OOB IP networking microstack 844 to extract the management request or command. The request or command is then processed by the ME aspects of LAN microcontroller/ME 812 using SEI subsystem 700 in the manner described above. In view of communication passed between remote management server 886 and LAN microcontroller/ME 812 and management operations performed by the ME on the device via the SEI subsystem, the results of various platform management operations (such as error log retrieval) will be displayed on a remote management console 888.

FIG. 9 shows details of a hardware architecture corresponding to one embodiment of LAN microcontroller/ME 812. The LAN microcontroller/ME includes a processor 900, coupled to random access memory (RAM) 902, and read-only memory (ROM) 904 via a bus 906. The LAN microcontroller/ME further includes multiple I/O interfaces, including network interface 846, SPI interface 856, PCIe interface 858 and SMbus interface 860. In one embodiment, a cache 908 is coupled between processor 900 and SPI interface 856.

In general, the operations of the various components comprising OOB IP networking μstack 844, OOB web server 840, SP error handlers, and SEI subsystem 700 may be facilitated via execution of instructions provided by LAN microcontroller firmware 850, management engine firmware 852 (or other firmware store on-board LAN microcontroller/ME 812 in ROM 904) on processor 900. Additionally, the operations of SPI interface 856, PCIe interface 858 and SMbus interface 860 may be facilitated via hardware logic and/or execution of instructions provided by LAN microcontroller firmware 850 (or other firmware store on-board LAN microcontroller 812) on processor 900. Furthermore, all or a portion of the firmware instructions may be loaded via a network store using the OOB communications channel. Additionally, remote management application 884 may generally be embodied as sets of instructions corresponding to one or more software modules or applications.

The foregoing ME implementation using an embedded processor is merely exemplary, as ME functionality may be implemented via one of several means. For example, the ME functionality may also be implemented using a management application on the host, a sequestered processor core (dedicated to management) in a multi-core processor, a virtual partition dedicated to management, or a virtual partition associated with a virtual machine monitor (VMM) that performs certain management functions. These various management environments may implement one or more different types of code. For example, such code might include conventional machine code, EFI byte code, or a virtual machine code such as Java byte code or the like.

Thus, embodiments of this invention may be used as or to support software and/or firmware instructions executed upon some form of processing core (such as the processor of a computer) or otherwise implemented or realized upon or within a machine-readable medium. A machine-readable medium includes any mechanism for storing or transmitting information in a form readable by a machine (e.g., a computer). For example, a machine-readable medium can include such as a read only memory (ROM); a random access memory (RAM); a magnetic disk storage media; an optical storage media; and a flash memory device, etc. In addition, a machine-readable medium can include propagated signals such as electrical, optical, acoustical or other form of propagated signals (e.g., carrier waves, infrared signals, digital signals, etc.).

As discussed above, different implementations of the error-handling mechanisms described here may employ SMM error handling or employ error-handling services provided by a service processor or equivalent. The partitioning of the firmware operations are specific to each implementation. Generally, the CFS interface will be made available to the OS through an OS runtime interface, such as provided by EFI runtime services, the execution of firmware on a platforms main processor (or one of the platform processors for a multi-processor platform). However, the remainder of the firmware services, which are transparent to the OS, will be provided via firmware that is either accessed via SMM or accessed via a separate physical or virtual processor, or dedicated management core for a multi-core processor.

Figure 10A:
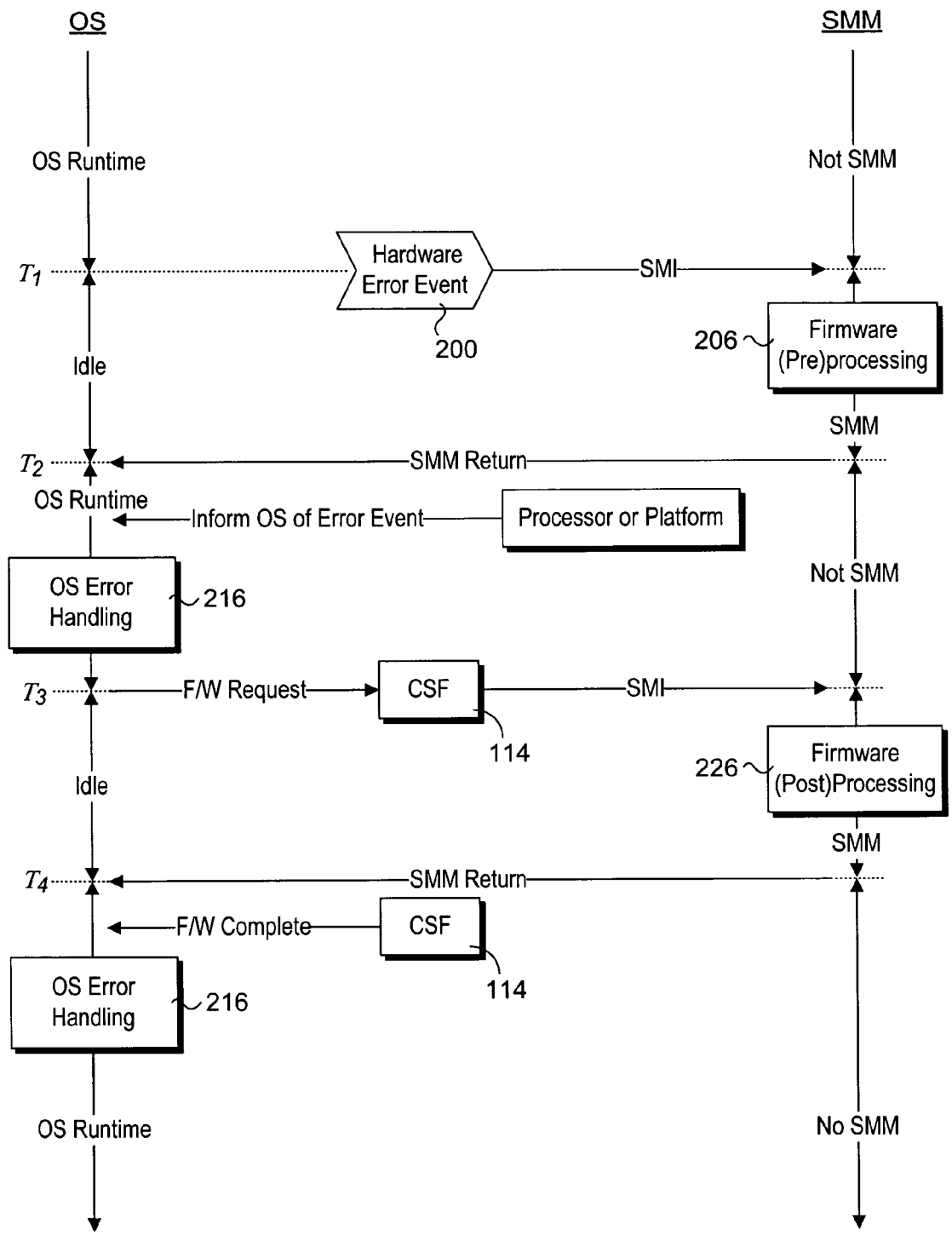
FIG. 10*a* is a timeline diagram illustrating operations performed during coordinated error handling using an SMM mode of a platform processor.

A timeline illustrating one implementation of a SMM scheme is shown in FIG. 10*a*. At time $T_1$, a hardware event 200 is detected by the platform hardware or processor, and an SMI is enunciated in response thereto through a previously-configured firmware mechanism. The SMI causes the platform processor to switch to its system management mode (SMM), a special operating mode that is hidden from the OS. In conjunction with the processor mode switch, the context of the current thread executing on the OS is stored in the processor registers. In response to an SMI, a set of SMM handlers (stored in a partitioned portion of system memory called SMRAM) is walked to identify an appropriate handler, which is then used to perform firmware preprocessing operations 206. Upon completion of these operations at time $T_2$, an SMM return instruction is executed to cause the processor to return to its previous execution context, resuming execution of the operating system's current thread. At substantially the same time, the processor or platform informs the OS of the hardware error event, such as via the use of an MCE, NMI, or CPEI. The OS then performs OS error handling 216 until time $T_3$, at which point the OS may submit a request for firmware error-handling services via CSF interface 114. Once again, an SMI is enunciated, switching the mode to SMM, and an appropriate SMM handler is identified and executed to perform firmware processing operations 226. Upon completion, another SMM return instruction is executed, returning control to the OS at time $T_4$. At substantially the same time, CSF 114 informs the OS that the firmware services are complete, and the OS either performs additional OS error handling 216 or merely continuous OS runtime operations.

The foregoing use of SMM is somewhat simplified for clarity. In actual practice, there will be an SMI-SMM-Return cycle for each request the OS makes through CSF interface 114. For example, an SMI-SMM-Return will be performed in response to each of a GetRecord( ) and ClearRecord( ) call.

Figure 10B:
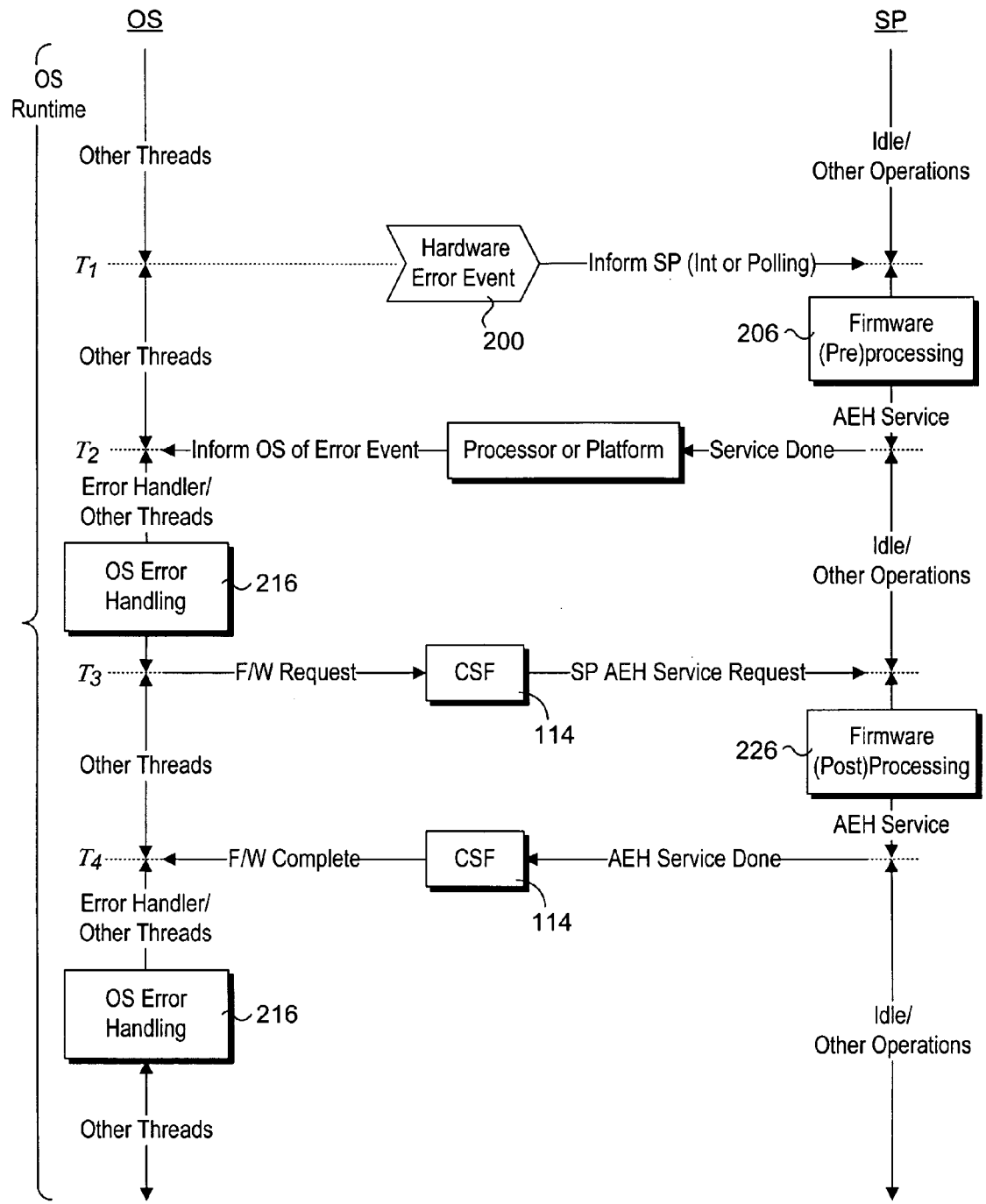
FIG. 10*b* is a timeline diagram illustrating operations performed during coordinated error handling using a service processor.

FIG. 10*b* illustrates a timeline corresponding to operations performed by an OS and firmware executed on a service processor to perform coordinated error handling. Generally, the operations are similar to those discussed above with reference to FIG. 10*a*, except the OS and firmware error handling operations are performed on separate processors. Accordingly, the OS is always in the OS runtime state, and the service processor is always in its own runtime state.

As before, the process begins at time $T_1$ with detection of a hardware error event 200. In response, the SP is informed of the vent. This typically may be performed via the platform (via an interrupt) or firmware (e.g., via a call to the SEI), or via polling by the SP. The SP then performs firmware preprocessing operations 206 via execution of corresponding firmware on the SP's embedded processor. Upon completion of this firmware service, the processor or platform is advised, and the OS is informed of the event at time $T_2$. The OS then launches an appropriate error handler thread to perform error handling 216. If the firmware handling mode is supported, the processor may then submit one or more firmware service requests to CSF 114 (as depicted at time $T_3$), which passes the request to the service processor (e.g., through the SEI). The service processor may then perform corresponding firmware processor 226. Upon completion of the service, corresponding information is forwarded through CSF 114 to the OS, as depicted at time $T_4$.

The foregoing coordinated error-handling mechanisms provide several advantages over current approaches. Notably, the mechanisms provide high-end RAS capabilities without requiring associated hardware/architecture changes. This removes the constraint from the hardware designers of having to make every detail of error reporting architectural in order to get OS support. Furthermore, require minimal, if any, changes to the OS (e.g., added features could be simply incorporated via an OS add-on driver), while maintaining backward compatibility with existing operating system software and applications.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method comprising:
    providing a firmware interface for an operating system (OS) to access firmware error-handling services provided by a platform firmware and for the OS to access platform and processor hardware error data;
    identifying a type of a hardware error;
    determining if the type of the hardware error may be serviced by the firmware error-handling service, and if so,
        submitting an error handling service request from the OS through the firmware interface to perform a firmware error-handling service related to the hardware error wherein the firmware error-handling service may service the hardware error and generate platform and processor error data, and
        performing the firmware error-handling service and generating platform and processor error data, otherwise,
    processing any platform and processor error data related to the hardware error, including collecting and formatting the platform error data; and providing the OS access to the platform and processor error data through the firmware interface.

2. The method of claim 1, wherein the firmware interface comprises an Extensible Firmware Interface OS runtime interface.

3. The method of claim 1, further comprising:
    performing the firmware error-handling service through execution of platform firmware using a system management mode (SMM) of a processor.

4. The method of claim 1, further comprising:
    performing the firmware error-handling service through execution of platform firmware on one of a service processor (SP) or baseboard management controller (BMC).

5. The method of claim 1, further comprising:
    performing an OS-error handling service using the data that is accessed.

6. The method of claim 4, further comprising:
    forwarding information obtained through the firmware error-handling service to a network target using an out-of-band (OOB) communication channel.

7. A machine-readable storage medium to provide firmware instructions, which if executed on a platform perform operations comprising:
    providing a firmware interface for an operating system (OS) to access firmware error-handling services and for the OS to access platform and processor hardware error data;
    receiving an error handling service request from the OS through the firmware interface to perform a firmware error-handling service related to a hardware error event;
    performing the firmware error-handling service to service at least a portion of the hardware error event, the firmware error-handling service producing platform and processor error data;
    providing the OS access to the platform and processor error data produced by the firmware error-handling service through the firmware interface; and
    asserting an interrupt to the operating system to initiate an OS-based error handling service on the hardware error event using the platform and processor error data that is accessible through the firmware interface.

8. The machine-readable storage medium of claim 7, wherein the firmware interface is facilitated through execution of a first portion of the firmware instructions using a runtime mode of a platform processor, and the firmware error-handling service is performed through execution of a second portion of the firmware instructions using a system management mode of the platform processor.

9. The machine-readable storage medium of claim 7, wherein the firmware interface is facilitated through execution of a first portion of the firmware instructions on a platform processor, and the firmware error-handling service is performed through execution of a second portion of the firmware instructions on one of a service processor or baseboard management controller hosted by the platform.

10. The machine-readable storage medium of claim 7, wherein execution of the firmware instructions perform further operations comprising:
    intercepting handling of a hardware error event to pass error-handling control to a firmware error-handling service.

11. A computer platform, comprising:
    a platform processor;
    an input/output controller hub (ICH), operatively coupled to the platform processor;
    a peripheral device;
    a service processor, operatively coupled to or included in the ICH; and
    at least one storage device, operatively-coupled to the platform processor and the service processor and having firmware instructions stored therein, including,
        a first portion of firmware instructions to be executed on the service processor to perform a firmware error-handling service wherein the firmware error-handling service may service a hardware error event, generate platform and processor error data, and assert an interrupt to the operating system to initiate operating system (OS)-based error handling of the hardware error event;
        a second portion of firmware instructions to be executed on the service processor to perform processing on any platform and processor error data related to the hardware error, including collecting and formatting the platform error data for hardware error events not serviced by the firmware error-handling service; and
        a third portion of firmware instructions to be executed on the platform processor to effect a firmware interface for an operating system (OS) to access the firmware error-handling services through the firmware interface wherein the firmware interface allows the OS to access the platform and processor hardware error data generated by the first portion of firmware instructions, or processed by second portion of firmware instructions.

12. The computer platform of claim 11, wherein execution of the second portion of firmware instructions performs further operations comprising:

intercepting handling of a hardware error event to pass error-handling control to a firmware error-handling service.

13. The computer platform of claim 11, further comprising:

a local area network (LAN) microcontroller, operatively coupled to or included in the ICH, the LAN microcontroller including an embedded processor comprising the service processor and a network interface to support an out-of-band (OOB) communication channel; and a third portion of firmware instructions, which if executed by the service processor performs the operation of forwarding information obtained through the firmware error-handling service to a network target using the OOB communication channel.

* * * * *